US010827012B2

(12) United States Patent
Wang et al.

(10) Patent No.: US 10,827,012 B2
(45) Date of Patent: Nov. 3, 2020

(54) METHOD AND APPARATUS FOR RECOGNIZING USER RELATIONSHIP, STORAGE MEDIUM AND SERVER

(71) Applicant: Baidu Online Network Technology (Beijing) Co., Ltd., Beijing (CN)

(72) Inventors: Chao Wang, Beijing (CN); Hao Yu, Beijing (CN); Yang Guo, Beijing (CN)

(73) Assignee: Baidu Online Network Technology (Beijing) Co., Ltd., Beijing (CN)

( * ) Notice: Subject to any disclaimer, the term of this patent is extended or adjusted under 35 U.S.C. 154(b) by 60 days.

(21) Appl. No.: 15/765,216

(22) PCT Filed: Dec. 25, 2015

(86) PCT No.: PCT/CN2015/099010
§ 371 (c)(1),
(2) Date: Mar. 30, 2018

(87) PCT Pub. No.: WO2017/054343
PCT Pub. Date: Apr. 6, 2017

(65) Prior Publication Data
US 2018/0278702 A1 Sep. 27, 2018

(30) Foreign Application Priority Data
Sep. 30, 2015 (CN) .......................... 2015 1 0639155

(51) Int. Cl.
*H04L 29/08* (2006.01)
*G06F 16/901* (2019.01)
(Continued)

(52) U.S. Cl.
CPC .............. *H04L 67/22* (2013.01); *G01S 19/42* (2013.01); *G01S 19/51* (2013.01); *G06F 16/901* (2019.01);
(Continued)

(58) Field of Classification Search
CPC ........... G01S 19/42; G01S 19/51; G06N 5/00; G06N 7/023; G06Q 10/0635;
(Continued)

(56) References Cited

U.S. PATENT DOCUMENTS

| 8,135,624 | B1 * | 3/2012 | Ramalingam | ......... H04W 4/029 705/26.1 |
| 8,509,734 | B1 * | 8/2013 | Gupta | ................... G06Q 20/04 455/406 |

(Continued)

FOREIGN PATENT DOCUMENTS

| CN | 101447043 A | 6/2009 |
| CN | 102541886 A | 7/2012 |

(Continued)

OTHER PUBLICATIONS

International Search Report dated Mar. 3, 2016 for International Application No. PCT/CN2015/099010, 5 pages.
(Continued)

*Primary Examiner* — George C Neurauter, Jr.
(74) *Attorney, Agent, or Firm* — Knobbe, Martens, Olson & Bear, LLP (57) ABSTRACT

Embodiments of the present disclosure disclose a method and an apparatus for recognizing a user relationship, a storage medium and a server. The method comprises: acquiring a wireless network address and coordinate information of each of networked user terminals; training a position-setting classifier based on the wireless network address and the coordinate information of each of known users having a known set position coordinate; determining a set position wireless network address for each of unknown users having an unknown set position coordinate based on the position-setting classifier; and marking a relationship of at least two users based on a common relationship of the set position wireless network address. In the present disclosure, based on
(Continued)

networked information of user terminals, set position wireless network addresses of unknown users are determined by training classifiers to mark relationships among users.

10 Claims, 3 Drawing Sheets (51) Int. Cl.
| | |
|---|---|
| *G06Q 30/02* | (2012.01) |
| *G06Q 50/00* | (2012.01) |
| *G01S 19/42* | (2010.01) |
| *G01S 19/51* | (2010.01) |
| *G06N 7/02* | (2006.01) |
| *H04W 4/02* | (2018.01) |
| *G06N 5/00* | (2006.01) |
| *G06Q 10/06* | (2012.01) |
| *H04W 64/00* | (2009.01) |
| *G06K 9/62* | (2006.01) |
| *H04W 8/22* | (2009.01) |
| *H04W 8/26* | (2009.01) |

(52) U.S. Cl.
CPC ......... *G06K 9/6218* (2013.01); *G06K 9/6269* (2013.01); *G06K 9/6276* (2013.01); *G06K 9/6282* (2013.01); *G06N 5/00* (2013.01); *G06N 7/023* (2013.01); *G06Q 10/0635* (2013.01); *G06Q 30/02* (2013.01); *G06Q 30/0201* (2013.01); *G06Q 30/0214* (2013.01); *G06Q 30/0222* (2013.01); *G06Q 30/0225* (2013.01); *G06Q 50/01* (2013.01); *H04W 4/02* (2013.01); *H04W 4/023* (2013.01); *H04W 8/22* (2013.01); *H04W 8/26* (2013.01); *H04W 64/00* (2013.01)

(58) Field of Classification Search
CPC .......... G06Q 30/0225; G06Q 30/0222; G06Q 30/0214; G06Q 30/02; G06Q 30/0201; G06Q 50/01; H04W 12/00; H04W 64/00; H04W 4/02; H04W 4/023; H04W 8/22; H04W 8/26; H04L 67/22; G06F 16/901; G06K 9/6218; G06K 9/6269; G06K 9/6276; G06K 9/6282

See application file for complete search history.

(56) References Cited

U.S. PATENT DOCUMENTS

| | | | | |
|---|---|---|---|---|
| 9,576,284 | B2* | 2/2017 | Runyan | G06Q 20/42 |
| 9,788,158 | B1* | 10/2017 | Rothman | H04W 64/00 |
| 10,036,638 | B2* | 7/2018 | D'Alberto | H04W 4/029 |
| 10,037,374 | B2* | 7/2018 | Schwartz | G06F 16/285 |
| 10,327,094 | B2* | 6/2019 | D'Alberto | H04W 64/003 |
| 2009/0136909 | A1 | 5/2009 | Asukai et al. | |
| 2011/0177802 | A1 | 7/2011 | Gupta | |
| 2012/0071175 | A1* | 3/2012 | Skibiski | G06Q 30/02 455/456.3 |
| 2014/0230030 | A1* | 8/2014 | Abhyanker | H04L 63/107 726/6 |
| 2014/0324964 | A1* | 10/2014 | Anand | H04L 67/22 709/204 |
| 2015/0026181 | A1* | 1/2015 | Milton | G06Q 30/0269 707/737 |
| 2015/0081860 | A1 | 3/2015 | Kuehnel et al. | |
| 2015/0149091 | A1* | 5/2015 | Milton | H04W 4/029 702/2 |
| 2015/0304815 | A1 | 10/2015 | Ghose et al. | |
| 2016/0316323 | A1 | 10/2016 | Situ et al. | |
| 2016/0358214 | A1 | 12/2016 | Shalunov et al. | |
| 2017/0111364 | A1* | 4/2017 | Rawat | H04L 63/102 |
| 2017/0324818 | A1* | 11/2017 | Williams | H04L 67/18 |
| 2018/0234511 | A1* | 8/2018 | Williams | H04L 67/18 |
| 2018/0337927 | A1* | 11/2018 | Carnahan | G06K 9/6259 |
| 2018/0338245 | A1* | 11/2018 | Tam | H04W 16/14 |
| 2018/0349606 | A1* | 12/2018 | Zhang | G06F 21/552 |
| 2019/0018956 | A1* | 1/2019 | Sadaghiani | G06N 20/00 |
| 2019/0045331 | A1* | 2/2019 | Liang | H04W 4/185 |
| 2019/0108334 | A1* | 4/2019 | Sadaghiani | G06N 20/00 |
| 2019/0132224 | A1* | 5/2019 | Verma | H04L 47/2441 |
| 2019/0132352 | A1* | 5/2019 | Zhang | H04L 63/1441 |
| 2019/0171944 | A1* | 6/2019 | Lu | G06N 20/00 |
| 2019/0173889 | A1* | 6/2019 | Carnahan | G06K 9/6259 |

FOREIGN PATENT DOCUMENTS

| | | |
|---|---|---|
| CN | 104615608 A | 5/2015 |
| CN | 104636382 A | 5/2015 |
| JP | 2014-182609 A | 9/2014 |
| JP | 2015132983 A | 7/2015 |
| JP | 2015-528265 A | 9/2015 |
| KR | 10-2012-0120313 B1 | 10/2014 |
| WO | 2010001483 A1 | 1/2010 |
| WO | 2015127312 A1 | 8/2015 |

OTHER PUBLICATIONS

Written Opinion of the International Searching Authority dated Mar. 3, 2016 for International Application No. PCT/CN2015/099010, 3 pages.

\* cited by examiner

Fig. 4

METHOD AND APPARATUS FOR RECOGNIZING USER RELATIONSHIP, STORAGE MEDIUM AND SERVER

CROSS-REFERENCE TO RELATED APPLICATION

This patent application is the U.S. National Phase Application under 35 U.S.C. § 371 of International Application No. PCT/CN2015/099010, filed Dec. 25, 2015, designating the U.S. and published as WO 2017/054343 A1 on Apr. 6, 2017 which claims the priority to Chinese Patent Application No. 201510639155.4, filed on Sep. 30, 2015, entitled "Method and Apparatus for Recognizing User Relationship," having Baidu Online Network Technology (Beijing) Co., Ltd as the applicant, the entire content of each of which is incorporated herein by reference.

TECHNICAL FIELD

Embodiments of the present disclosure relate to computer technologies, and more particularly, to a method and an apparatus for recognizing a user relationship, a storage medium and a server.

BACKGROUND

With the development of mobile Internet technologies, there are more and more commercial promotion activities on the mobile Internet, such as Didi, Kuaidi, China Auto Rental, 51 Car Sharing, Tiantian Car Sharing and other ride sharing, tailored taxis services and taxi calling services provided by Internet enterprises. Various taxi-hailing APPs are intended to provide the most convenient and fast services to users based on mobile Internet resources and technologies in a completely new approach.

Those companies choose promotions adopting high allowances in their application programs in the commercial promotion activities on the mobile Internet. In actual life, acquaintances may collaboratively cheat for scalping to wangle allowance and obtain illegal economic benefit, thus causing loss to the companies in promotion activity cost. To prevent this problem, the existing Internet application programs generally extract the users' acquaintance relationships by using the address books in the users' mobile phones.

However, this approach needs to acquire the address books of the users. In most cases, most of the users are unwilling to provide their own address books. If the application programs actively read the users' address books, this may result in users' aversion, and loss of the users. In addition, extracting the users' acquaintance relationships using the address books in the mobile phones only can distinguish whether two persons know each other, but cannot precisely distinguish their acquaintance relationships such as families, friends or colleagues. Therefore, the existing technologies cannot solve the problem fundamentally.

SUMMARY

Embodiments of the present disclosure provide a method and an apparatus for recognizing a user relationship, a storage medium and a server to solve the problem that in the Internet promotion activities, acquaintances collaboratively cheat to acquire illegal economic incomes.

In a first aspect, an embodiment of the present disclosure provides a method for recognizing a user relationship, comprising:

acquiring a wireless network address and coordinate information of each of networked user terminals;

training a position-setting classifier based on the wireless network address and the coordinate information of each of known users having a known set position coordinate;

determining a set position wireless network address for each of unknown users having an unknown set position coordinate based on the position-setting classifier; and marking a relationship of at least two users based on a common relationship of the set position wireless network address.

In a second aspect, an embodiment of the present disclosure further provides an apparatus for recognizing a user relationship, comprising:

a networked information acquiring module, configured to acquire a wireless network address and coordinate information of each of networked user terminals;

a classifier training module, configured to train a position-setting classifier based on the wireless network address and the coordinate information of each of known users having a known set position coordinate;

a network address determining module, configured to determine a set position wireless network address for each of unknown users having an unknown set position coordinate based on the position-setting classifier; and a user relationship marking module, configured to mark a relationship of at least two users based on a common relationship of the set position wireless network address.

In a third aspect, an embodiment of the present disclosure further provides one or more storage media containing a computer-executable instruction, when being executed by a computer processor, the computer-executable instruction is configured to perform a method for recognizing a user relationship, wherein the method comprises:

acquiring a wireless network address and coordinate information of each of networked user terminals;

training a position-setting classifier based on the wireless network address and the coordinate information of each of known users having a known set position coordinate;

determining a set position wireless network address for each of unknown users having an unknown set position coordinate based on the position-setting classifier; and marking a relationship of at least two users based on a common relationship of the set position wireless network address.

In a fourth aspect, an embodiment of the present disclosure provides a server, comprising:

one or more processors;

a memory; and one or more modules, the one or more modules being stored in the memory, and when being executed by the one or more processors, the one or more modules being caused to:

acquire a wireless network address and coordinate information of each of networked user terminals;

train a position-setting classifier based on the wireless network address and the coordinate information of each of known users having a known set position coordinate;

determine a set position wireless network address for each of unknown users having an unknown set position coordinate based on the position-setting classifier; and mark a relationship of at least two users based on a common relationship of the set position wireless network address.

According to the method and the apparatus for recognizing a user relationship, the storage medium and the server provided by the embodiments of the present disclosure, after a wireless network address and coordinate information of each user terminal are acquired, a position-setting classifier is trained based on the wireless network address and the coordinate information of each known user, a set position wireless network address of each unknown user is determined based on the position-setting classifier, and a relationship of at least two users is marked based on a common relationship of the set position wireless network address. According to the technical solution, based on networked information of user terminals, set position wireless network addresses of unknown users are determined by means of training classifiers and data mining technologies to mark relationships among users. In this way, relationships among the users, such as families, friends or colleagues, may be precisely distinguished. By utilizing the technical solution, the relationships among the users may be precisely marked without extracting user terminal address books. Therefore, the problem that acquaintances collaboratively cheat to acquire illegal economic incomes in commercial promotion activities of the mobile Internet thereby causing the loss of promotion activity cost is solved, and the effect of Internet promotion activities is enhanced.

BRIEF DESCRIPTION OF THE DRAWINGS

To describe the technical solutions in the embodiments of the present disclosure more clearly, the following will briefly introduce accompanying drawings required for describing the embodiments. Apparently, the accompanying drawings in the following description show merely some embodiments of the present disclosure, and persons of ordinary skill in the art may further modify and substitute these accompanying drawings without creative efforts.

DETAILED DESCRIPTION OF EMBODIMENTS

To make the objectives, technical solutions, and advantages of the present disclosure clearer, the following will clearly and completely describe the technical solutions of the present disclosure with reference to the accompanying drawings in the embodiments of the present disclosure. Apparently, the described embodiments are some but not all of the embodiments of the present disclosure. All other embodiments obtained by persons of ordinary skill in the art based on the embodiments of the present disclosure without creative efforts shall fall within the protection scope of the present disclosure.

First Embodiment

Figure 1:
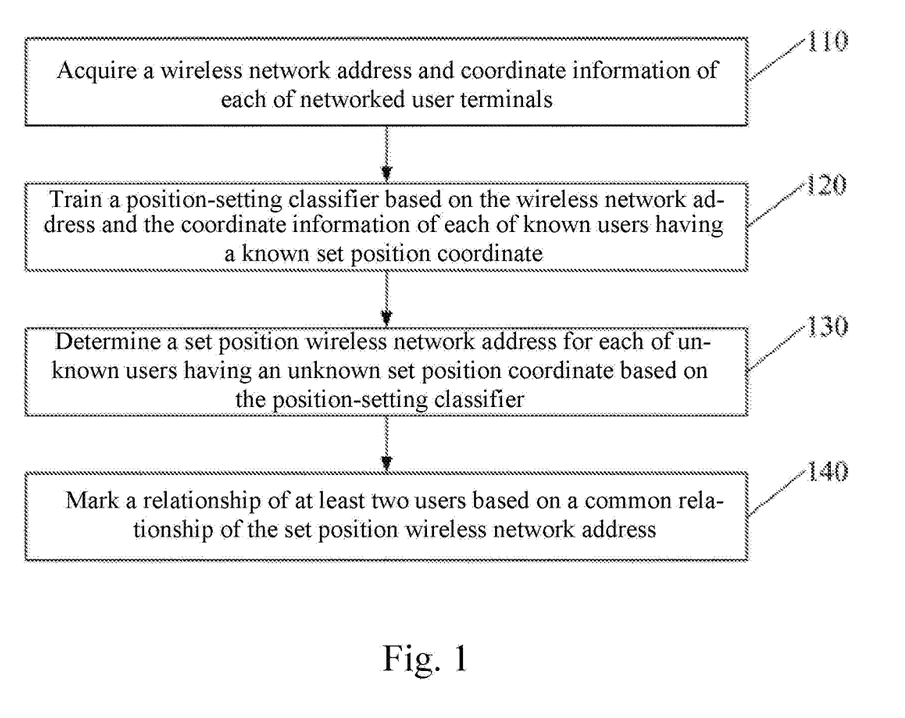
FIG. 1 is a flowchart of a method for recognizing a user relationship according to a first embodiment of the present disclosure.

As shown in FIG. 1, which is a flowchart of a method for recognizing a user relationship according to a first embodiment of the present disclosure. The technical solution of this embodiment may be applicable to a case in which set positional information such as user families and work sites is mined based on wireless network information of user terminals, and also may be applicable to a case in which a relationship among users is recognized. The method may be performed by an apparatus for recognizing a user relationship and configured in a server.

The method for recognizing a user relationship provided by this embodiment specifically comprises following steps.

S110: acquiring a wireless network address and coordinate information of each user terminal.

Herein, the wireless network preferably is a common WiFi (Wireless Fidelity) wireless local area network, and the wireless network address is an MAC address of a WiFi router, hereinafter referred to as a WiFi MAC address. The reason for preferably selecting WiFi resides in that the WiFi MAC address is global unique and may be used as an identifier for identifying a router in the wireless network. In this embodiment, the method for recognizing a user relationship is described by taking an example in which the wireless network address is the WiFi MAC address.

After different terminals are connected to the WiFi router via the same WiFi, when terminal users conduct terminal networking via the wireless network and inputs, onto the terminals, instructions allowing to acquire positional information, the apparatus for recognizing a user relationship may acquire wireless network addresses of the terminal users and coordinate information of the networked positions. Therefore, the user is a user, among the terminal users, that is allowed to acquire the coordinate information. Herein the apparatus for recognizing a user relationship may acquire the coordinate information of the user by means of a positioning system such as GPS of the terminal.

Specifically, the wireless network address and the coordinate information may be acquired for the user by means of an application program used by the user on the terminal, and a corresponding relationship of the wireless network address and the coordinate information is stored in the server. The server may be an application server, in which the wireless network address and the coordinate information used for networking each user terminal and using the application program is stored. The server also may be a server of the apparatus for recognizing a user relationship or a storage server, in which the wireless network address and the coordinate information of each user terminal is stored.

S120: training a position-setting classifier based on the wireless network address and the coordinate information of each known users having the known set position coordinate.

In the above operation, the set position may be a family position. When the family positions of apart of users are known, family coordinates of this type of users are known. Correspondingly, for each users having the known set position coordinate, a family classifier may be trained based on the wireless network address and the coordinate information of this type of user terminals. The set position may be a work site. When the work sites of a part of users are known, work site coordinates of this type of users are known. Correspondingly, for each users having the known set position coordinate, a work site classifier may be trained based on the wireless network address and the coordinate information of this type of user terminals. The set positions also may be other positions required for training a classifier or at least two positions, etc.

Thus it can be known that a user having the known set position coordinate is a known user, and a user having an unknown set position coordinate is an unknown user. The set position coordinate of the unknown user may be determined by means of the position-setting classifier. In addition, when the set position preferably is a family or work site, the apparatus for recognizing a user relationship may acquire the family and/or the work site from the terminal for the known user, but the apparatus for recognizing a user relationship may be unable to acquire the family or the work site from the terminal for the unknown user. As thus, the family classifier and the work site classifier whose set positions are the family and the work site respectively may be trained based on the wireless network address and the coordinate information of each known user stored in the server.

S130: determining a set position wireless network address of each unknown users having an unknown set position coordinate is unknown based on the position-setting classifier.

In the above operation, a position-setting classifier may be trained based on the wireless network address and the coordinate information of each known user stored in the server. Taking the family classifier as an example, for data such as the wireless network address and the coordinate information of the unknown user, the data of the unknown user are classified by means of the family classifier based on data mining technologies, so that family data of the unknown user may be classified and mined. The family wireless network address may be determined based on the family data of the unknown user. Thus the set position wireless network address of each unknown users having an unknown set position coordinate is determined based on the position-setting classifier. In addition, the family coordinate of the unknown user may be determined based on the mined family data of the unknown user.

In the above operation, the set position wireless network address and the set position coordinate of the unknown user may be determined, based on the data mining technologies, based on the position-setting classifier and the wireless network address and the coordinate information of the unknown user. When the set position is a family or work site, the family or work site of the unknown user and the WiFi MAC address of the family router or the WiFi MAC address of the work site router are mined in the above operations S110~S130. Therefore, according to the technical solution, the set position wireless network address and the set position information such as the family or work site of the unknown user are mined based on the networked information of the user terminal.

S140: marking a relationship of at least two users based on a common relationship of the set position wireless network address.

In the above operation, the set position wireless network address and the set position information such as the family or work site of the unknown user are determined via data mining technologies based on the wireless network address and the coordinate information of the user terminal. The set position information being a family and a work site is taken as an example, for at least two users sharing the same family wireless network address, the relationship of at least two users is marked as a family or friend relationship, that is, the at least two users sharing the same family router are of a family or friend relationship. For at least two users sharing the same work site wireless network address, the relationship of the at least two users is marked as a colleague relationship, that is, the at least two users sharing the same work site router are of a colleague relationship. For at least two users sharing the same family wireless network address and the same work site wireless network address, the relationship of the at least two users is marked as a friend relationship. Herein, relationships among the users may be marked based on different set positions or other cases. For example, at least two users neither sharing the WiFi MAC address of the same family router nor sharing the WiFi MAC address of the same work site router are marked as a stranger relationship.

This embodiment provides a method for recognizing a user relationship. After a wireless network address and coordinate information of each user terminal are acquired, a position-setting classifier is trained based on the wireless network address and the coordinate information of each known user, and the position-setting classifier determines a set position wireless network address of each unknown user. In this way, a relationship of at least two users is marked based on a common relationship of the set position wireless network address. According to the technical solution, based on networked information of user terminals, set position wireless network addresses of unknown users are determined by means of training classifiers and data mining technologies to mark relationships among users. In this way, relationships among the users, such as families, friends or colleagues, may be precisely distinguished. By utilizing the technical solution, the relationships among the users may be precisely marked without extracting user terminal address books. Therefore, the problem that acquaintances collaboratively cheat to acquire illegal economic incomes in commercial promotion activities of the mobile Internet thereby causing the loss of promotion activity cost is solved, and the effect of Internet promotion activities is enhanced.

Second Embodiment

Figure 2:
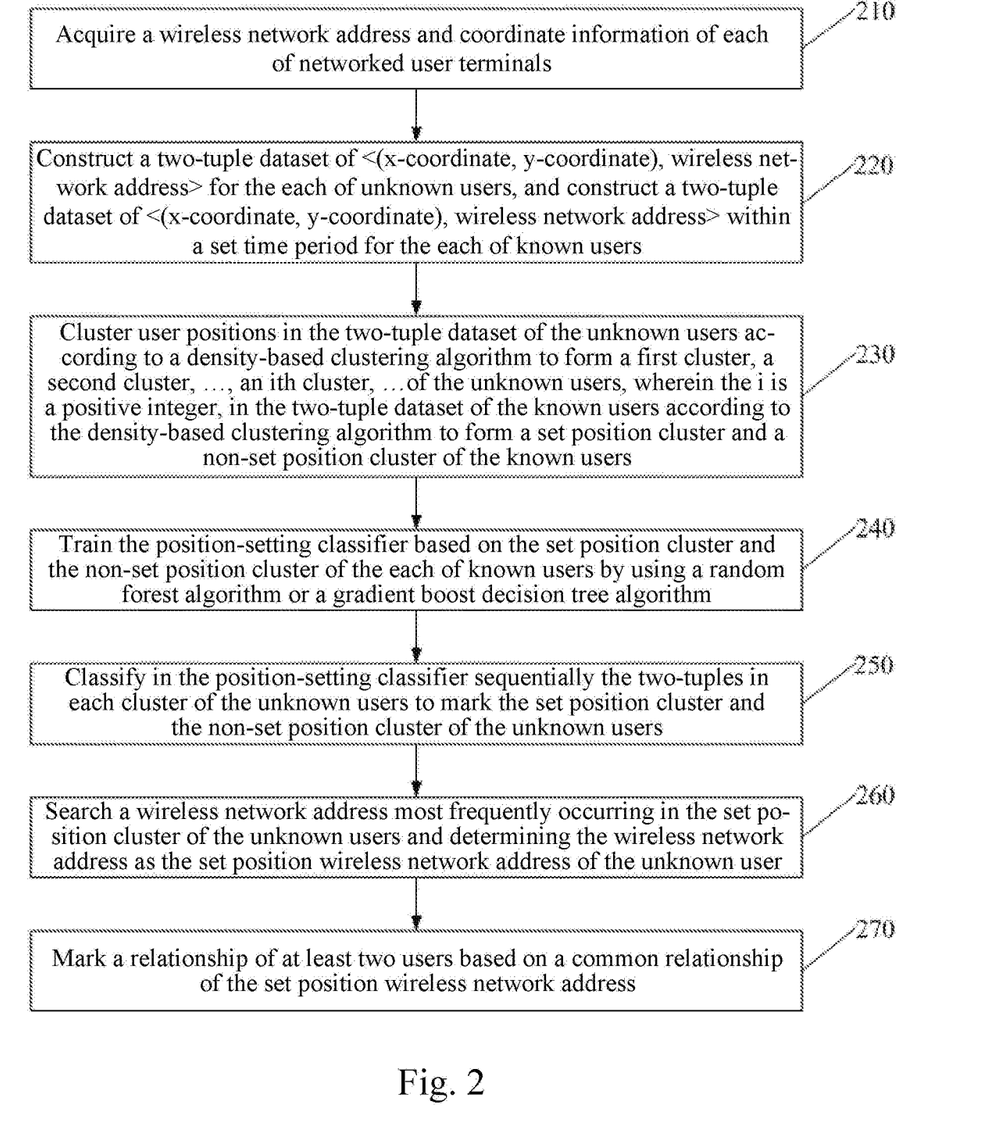
FIG. 2 is a flowchart of a method for recognizing a user relationship according to a second embodiment of the present disclosure.

As shown in FIG. 2, which is a flowchart of a method for recognizing a user relationship according to a second embodiment of the present disclosure. The technical solution of this embodiment may be applicable to a case in which set positional information such as user families and work sites is mined based on wireless network information of user terminals, and also may be applicable to a case in which a relationship among users is recognized. The method may be performed by an apparatus for recognizing a user relationship and configured in a server.

The method for recognizing a user relationship provided by this embodiment specifically comprises following steps.

S210: acquiring a wireless network address and coordinate information of each user terminal.

In the above operation, the wireless network preferably is a common WiFi, and the wireless network address is an MAC address of a WiFi router, hereinafter referred to as a WiFi MAC address. The user is a user, among the terminal users, that is allowed to acquire the coordinate information. In this embodiment, the method for recognizing a user relationship is described by taking an example in which the wireless network address is the WiFi MAC address of the router.

After the wireless network address and the coordinate information of the user are acquired, a corresponding relationship between the wireless network address and the coordinate information is stored in the server. Optionally, networked time information of each user terminal also may be acquired, and the corresponding relationship among the wireless network address, the coordinate information and the time information needs to be stored in the server.

S220: constructing a two-tuple dataset of <(x-coordinate, y-coordinate), wireless network address> for each unknown user, and constructing a two-tuple dataset of <(x-coordinate, y-coordinate), wireless network address> within a set time period for each known user.

In the above operation, a user having the known set position coordinate is a known user, and a user having an unknown set position coordinate is unknown is an unknown user. Optionally, the set time period may be set as two months, or three months, or the third quarter of 2015.

For any one unknown user, all user two-tuples <(x-coordinate, y-coordinate), wireless network address> of the unknown user are constituted based on the corresponding relationship of the wireless network address and the coordinate information of the unknown user in the server. The set of all the user two-tuples of the unknown user is constructed as a two-tuple dataset thereof.

For any one known user, all the wireless network addresses and the coordinate information, of the known user, within the set time period are constructed as a dataset. The two-tuples dataset of user <(x-coordinate, y-coordinate), wireless network address> of the known user is constructed based on the corresponding relationship between the wireless network address and the coordinate information of the known user within the set time period in the server.

S230: clustering user positions, in the two-tuple dataset, of the unknown user according to a density-based clustering algorithm to form a first cluster, a second cluster, . . . , an $i^{th}$ cluster, . . . of the unknown user, wherein the i is a positive integer; and clustering user positions, in the two-tuple dataset, of the known user according to the density-based clustering algorithm to form a set position cluster and a non-set position cluster of the known user.

The density-based clustering algorithm is a density-based spatial clustering algorithm, in which, a region having enough density is divided into clusters, and clusters of arbitrary shapes are found in a spatial database having noise, wherein a cluster is defined as a maximizing set of density-connected points. Herein, user positions in the two-tuple dataset of the unknown user and the known user may be clustered using other clustering algorithms such as a hierarchical-based clustering algorithm.

In the above operation, for any one unknown user, the user positions in the two-tuple dataset of the unknown user are clustered according to the density-based clustering algorithm, wherein the user positions refer to coordinate information in the dataset. In this way, the first cluster, the second cluster, . . . , the $i^{th}$ cluster, . . . of the unknown user is formed, wherein the i is a positive integer, and markings of the clusters of the unknown user are unknown. The number of the clusters of different unknown users may likely be different.

For any one known user, at least two clusters of the known user may be formed by clustering the user positions, in the two-tuple dataset, of the known user according to the density-based clustering algorithm, wherein clusters containing the known set position coordinates are the set position clusters of the known user, and the remaining clusters not containing the known set position coordinates are the non-set position clusters. When the set positions are families and work sites and the clusters formed for the known user by clustering comprise the first cluster, the second cluster, the third cluster and the fourth cluster, the clusters containing family coordinates are marked as home, the clusters containing work site coordinates are marked as company, and the other two clusters are marked as nouse1 and nouse2. In this case, the known user comprises one family cluster and three non-family clusters, or comprises one work site cluster and three non-work site clusters.

S240: training the position-setting classifier based on the set position cluster and the non-set position cluster of each known user using a random forest algorithm or a gradient boost decision tree (GBDT) algorithm.

In the above operation, the classifier is trained based on the set position cluster and the non-set position cluster of each known user using a random forest algorithm or a gradient boost decision tree (GBDT) algorithm to construct the position-setting classifier. When the set positions are work sites and families, the total number of the family clusters of the known user is 10, the total number of the work site clusters is 6 and the total number of the other clusters is 24, the family classifier and the work site classifier need to be trained, that is, the family classifier is trained based on the 10 family clusters and (6+24) non-family clusters, and the work site classifier is trained based on the 6 work site clusters and (10+24) non-work site clusters. Those skilled in the art may know that the random forest algorithm and the GBDT algorithm are two classification algorithms common in the data mining technology. Based on the data mining technology, herein the classifier also may be trained by means of a k-nearest neighbours algorithm (KNN), or a support vector machine or other classification algorithms.

Data in the clusters of the known user are user two-tuples, the corresponding relationship among the wireless network address of the user, the coordinate information and the time information is stored in the server, and the training attribute of a corresponding position-setting classifier comprises at least one of: training the family classifier is taken as an example, for any one known user, a ratio of a number of days for occurrences of each wireless network address in the set position cluster (family cluster) of the known user to the set time period, for example, when a WiFi MAC address A occurred on the first day, the sixth day and the seventh day within the set time period (60 days), the ratio is 3/60; a ratio of a number of occurrence, at day, of each wireless network address in the set position cluster (family cluster) of the known user to a number of occurrences at night; a ratio of a number of occurrence, in one time period, of each wireless network address in the set position cluster (family cluster) of the known user to a number of occurrences in another one of at least two time periods in a day; and a wireless network address entropy calculated based on a probability of occurrences of each wireless network address in the set position cluster (family cluster) of each known user. Those skilled in the art may know that the training attribute of the family classifier may further comprise other attributes, and the training attributes of different classifiers may be different, which is not described in detail herein.

It is to be noted that in addition to the set position, the classifier may be trained for clusters marked as nouse, that is, a nouse classifier is formed, wherein the nouse classifier is configured to classify and mark the non-set position clusters of the unknown user.

S250: classifying, in the position-setting classifier sequentially, the two-tuples in each cluster of the unknown user to mark the set position cluster and the non-set position cluster of the unknown user.

In the above operation, the two-tuples in each cluster of the unknown user are classified sequentially in the position-setting classifier based on the trained position-setting classifier such as the family classifier or the work site classifier to mark the set position cluster and the non-set position cluster of the unknown user. The clusters of the unknown user comprise the first cluster, the second cluster, . . . , the $i^{th}$ cluster, . . . , after the clusters of the unknown user are classified and marked, the family clusters and the work site clusters of the unknown user may be marked, that is, the set position clusters of the unknown user are marked based on the position-setting classifier. Herein, the non-set position clusters of the unknown user may be marked based on the non-position-setting classifier, for example, the nouse cluster of the unknown user is marked based on the nouse classifier.

S260: searching the wireless network address most frequently occurring in the set position cluster of the unknown user and determining the same as the set position wireless network address of the unknown user.

In the above operation, after each cluster of each unknown user is marked, for any one user, a family cluster, a work site cluster and other clusters are taken as examples, the wireless network address most frequently occurring in the family cluster is determined as a family wireless network address of the unknown user, and the wireless network address most frequently occurring in the work site cluster is determined as a work site wireless network address of the unknown user. Thus, the wireless network address most frequently occurring in the set position cluster of the unknown user is searched and determined as the set position wireless network address of the unknown user.

In addition, the identical coordinate information most frequently occurring in the family cluster of the unknown user or a central coordinate of the family cluster may be determined as the family position of the unknown user, and the identical coordinate information most frequently occurring in the work site cluster of the unknown user or a central coordinate of the work site cluster may be determined as a work site position of the unknown user. Those skilled in the art may know that the set position of the unknown user also may be determined based on other data in the cluster. For example, a limited range of the family cluster of the unknown user may be determined as a family position range of the unknown user, and a limited range of the work site cluster of the unknown user may be determined as a work site position range of the unknown user.

S270: marking a relationship of at least two users based on a common relationship of the set position wireless network address.

In the above operation, for marking of user relationships, at least two users sharing the same family wireless network address may be marked as a family relationship or a friend relationship, that is, at least two users sharing the same family router are of the family or friend relationship. For example, at least two users sharing the same work site wireless network address may be marked as a colleague relationship or the friend relationship, that is, at least two users sharing the same work site router are of the colleague relationship. At least two users neither sharing the same family wireless network address nor sharing the same work site wireless network address may be marked as a stranger relationship.

It is to be noted that the operation of constructing a two-tuple dataset of an unknown user in S220 and the operation of clustering user positions, in the two-tuple dataset, of the unknown user according to a density-based clustering algorithm to form a cluster of the unknown user in S230 also may be executed after S240.

Using the method for recognizing a user relationship provided by this embodiment, a two-tuple dataset of each unknown user and a two-tuple dataset of each known user are constructed based on a wireless network address and coordinate information of each user terminal, a cluster of each unknown user and a set position cluster of each known user are formed according to a density-based clustering algorithm, a position-setting classifier is trained according to a cluster of each known user using data mining technologies such as GBDT to mark a set position cluster of each unknown user, a set position wireless network address is determined from the set position cluster of each unknown user, and a relationship of at least two users is marked. According to the technical solution, based on networked information of user terminals, set position wireless network addresses of unknown users are determined by means of training classifiers and data mining technologies to mark relationships among users. In this way, relationships among the users, such as families, friends or colleagues, may be precisely distinguished. By utilizing the technical solution, the relationships among the users may be precisely marked without extracting user terminal address books. Therefore, the problem that acquaintances collaboratively cheat to acquire illegal economic incomes in commercial promotion activities of the mobile Internet thereby causing the loss of promotion activity cost is solved, and the effect of Internet promotion activities is enhanced.

Third Embodiment

Figure 3:
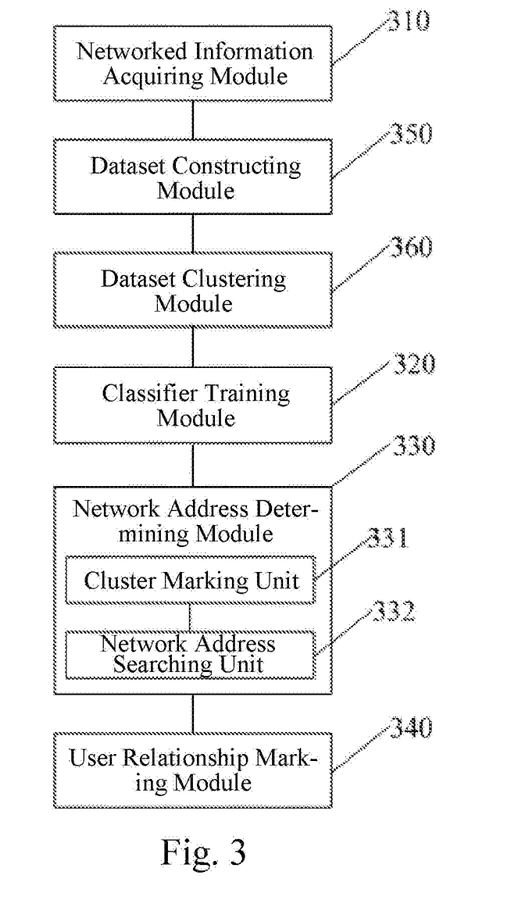
FIG. 3 is a schematic diagram of an apparatus for recognizing a user relationship according to a third embodiment of the present disclosure.

As shown in FIG. 3, which is a schematic diagram of an apparatus for recognizing a user relationship according to the third embodiment of the present disclosure. The technical solution of this embodiment may be applicable to a case in which set positional information such as user families and work sites is mined based on wireless network information of user terminals, and also may be applicable to a case in which a relationship among users is recognized. The apparatus may perform the method for recognizing a user relationship and may be configured in a server.

The apparatus for recognizing a user relationship provided by this embodiment comprises: a networked information acquiring module 310, a classifier training module 320, a network address determining module 330 and a user relationship marking module 340.

The networked information acquiring module 310 is configured to acquire a wireless network address and coordinate information of each user terminal. The classifier training module 320 is configured to train a position-setting classifier based on the wireless network address and the coordinate information of each known user having the known set position coordinate. The network address determining module 330 is configured to determine a set position wireless network address of each unknown users having an unknown set position coordinate is unknown based on the position-setting classifier. The user relationship marking module 340 is configured to mark a relationship of at least two users based on a common relationship of the set position wireless network address.

Optionally, the apparatus for recognizing a user relationship further comprises: a dataset constructing module 350 and a dataset clustering module 360.

The dataset constructing module 350 is configured to construct, after acquiring the wireless network address and the coordinate information of each user terminal, a two-tuple dataset of <(x-coordinate, y-coordinate), wireless network address> for each unknown user, and construct a two-tuple dataset of <(x-coordinate, y-coordinate), wireless network address> within a set time period for each known user. The dataset clustering module 360 is configured to cluster user positions, in the two-tuple dataset, of the unknown user according to a density-based clustering algorithm to form a first cluster, a second cluster, . . . , an $i^{th}$ cluster, . . . of the unknown user, wherein the i is a positive integer, and cluster user positions, in the two-tuple dataset, of the known user according to the density-based clustering algorithm to form a set position cluster and a non-set position cluster of the known user.

Optionally, the classifier training module 320 specifically comprises: training the position-setting classifier based on the set position cluster and the non-set position cluster of each known user using a random forest algorithm or a gradient boost decision tree (GBDT) algorithm.

Optionally, the networked information acquiring module 310 further comprises: acquiring time information for networking of each user terminal. Correspondingly, a training attribute of the position-setting classifier comprises at least one of:

a ratio of a number of days for occurrences of each wireless network address in the set position cluster of the known user to the set time period; a ratio of a number of occurrence, at day, of each wireless network address in the set position cluster of the known user to a number of occurrences at night;

a ratio a of number of occurrences, in one time period, of each wireless network address in the set position cluster of the known user to a number of occurrences in another one of at least two time periods in a day; and a wireless network address entropy calculated based on a probability of occurrences of each wireless network address in the set position cluster of the known user.

Optionally, the network address determining module 330 comprises: a cluster marking unit 331 and a network address searching unit 332.

The cluster marking unit 331 is configured to classify, in the position-setting classifier sequentially, the two-tuples in each cluster of the unknown user to mark a set position cluster and a non-set position cluster of the unknown user. The network address searching unit 332 is configured to search the wireless network address most frequently occurring in the set position cluster of the unknown user and determine the same as the set position wireless network address of the unknown user.

According to the apparatus for recognizing a user relationship provided by this embodiment, based on networked information of user terminals, set position wireless network addresses of unknown users are determined by means of training classifiers and data mining technologies to mark relationships among users. In this way, the relationships among the users, such as families, friends or colleagues, may be precisely distinguished. By utilizing the technical solution, the relationships among the users may be precisely marked without extracting user terminal address books. Therefore, the problem that acquaintances collaboratively cheat to acquire illegal economic incomes in commercial promotion activities of the mobile Internet thereby causing the loss of promotion activity cost is solved, and the effect of Internet promotion activities is enhanced.

Fourth Embodiment

This embodiment of the present disclosure provides a storage medium containing a computer-executable instruction, when being executed by a computer processor, the computer-executable instruction is configured to perform a method for recognizing a user relationship, wherein the method comprises:

acquiring a wireless network address and coordinate information of each user terminal;

training a position-setting classifier based on the wireless network address and the coordinate information of each known users having the known set position coordinate;

determining a set position wireless network address of each unknown users having an unknown set position coordinate based on the position-setting classifier; and marking a relationship of at least two users based on a common relationship of the set position wireless network address.

When the storage medium performs the method, after acquiring a wireless network address and coordinate information of each user terminal, the method may further comprise:

constructing a two-tuple dataset of <(x-coordinate, y-coordinate), wireless network address> for the each unknown user, and constructing a two-tuple dataset of <(x-coordinate, y-coordinate), wireless network address> within a set time period for the each known user;

clustering user positions, in the two-tuple dataset, of the unknown user according to a density-based clustering algorithm to form a first cluster, a second cluster, . . . , an $i^{th}$ cluster, . . . of the unknown user, wherein, the i is a positive integer; and clustering user positions, in the two-tuple dataset, of the known user according to the density-based clustering algorithm to form a set position cluster and a non-set position cluster of the known user.

When the storage medium performs the method, the training a position-setting classifier based on the wireless network address and the coordinate information of each known users having the known set position coordinate may further specifically comprise:

training the position-setting classifier based on the set position cluster and the non-set position cluster of the each known user using a random forest algorithm or a gradient boost decision tree (GBDT) algorithm.

When the storage medium performs the method, the method further comprises: acquiring networking time information of each user terminal. Correspondingly, a training attribute of the position-setting classifier comprises at least one of:

a ratio of a number of days for occurrences of each wireless network address in the set position cluster of the known user to the set time period;

a ratio of a number of occurrences, at day, of each wireless network address in the set position cluster of the known user to a number of occurrences at night;

a ratio of a number of occurrences, in one time period, of each wireless network address in the set position cluster of the known user to a number of occurrences in another one of at least two time periods in a day; and a wireless network address entropy calculated based on a probability of occurrences of each wireless network address in the set position cluster of the known user.

When the storage medium performs the method, the determining a set position wireless network address of each unknown users having an unknown set position coordinate based on the position-setting classifier may further specifically comprise:

classifying, in the position-setting classifier sequentially, the two-tuples in each cluster of the unknown user to mark a set position cluster and a non-set position cluster of the unknown user; and searching the wireless network address most frequently occurring in the set position cluster of the unknown user and determining the same as the set position wireless network address of the unknown user.

Fifth Embodiment

Figure 4:
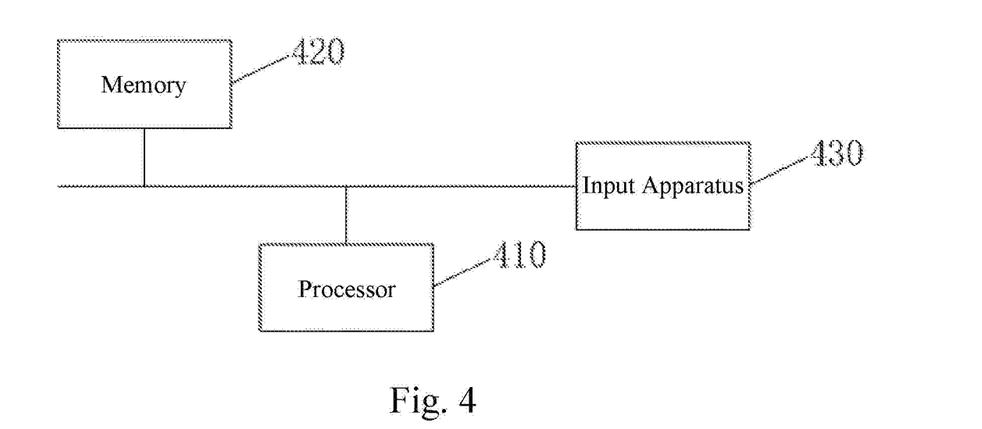
FIG. 4 is a schematic diagram illustrating hardware structure of a server for executing a method for recognizing a user relationship according to a fifth embodiment of the present disclosure.

FIG. 4 is a schematic diagram illustrating hardware structure of a server for executing a method for recognizing a user relationship according to the fifth embodiment of the present disclosure. Referring to FIG. 4, the server comprises:

one or more processors 410, in FIG. 4 one processor 410 being taken as an example;

a memory 420; and one or more modules.

The server may further comprise: an input apparatus 430. The processor 410, the memory 420 and the input apparatus 430 in the server may be connected by means of a bus or in other ways, in FIG. 4 connecting by means of a bus is taken as an example.

As a computer readable storage medium, the memory 420 may be configured to store software programs, computer-executable instructions and modules, such as program instructions/modules (for example, the networked information acquiring module 310, the classifier training module 320, the network address determining module 330 and the user relationship marking module 340 in the apparatus for recognizing a user relationship as shown in FIG. 3) corresponding to the method for recognizing a user relationship in the embodiments of the present disclosure. The processor 410 may execute various function applications and data processing of a server, namely implement the method for recognizing a user relationship in the foregoing method embodiments by running the software programs, instructions and modules stored in the memory 420.

The memory 420 may comprise a program storage area and a data storage area, where the program storage area may store an operating system, application programs required for at least one function; and the data storage area may store data created according to the use of the server. Besides, the memory 420 may include a high speed random access memory, or further include a non-volatile memory, for example, at least one magnetic disk storage device, a flash memory, or other non-volatile solid-state storage devices. In some embodiments, the memory 420 may further include some memories disposed remotely relative to the processor 410, and these remote memories may be connected to the server through the network. Instances of the foregoing networks include but are not limited to the Internet, the Intranet, a local area network (LAN), a mobile communication network and a combination thereof.

The input apparatus 430 may be configured to receive inputted wireless network address and coordinate information.

The one or more modules are stored in the memory 420, and when being executed by the one or more processors 410, the one or more modules are caused to:

acquire a wireless network address and coordinate information of each user terminal;

train a position-setting classifier based on the wireless network address and the coordinate information of each known users having the known set position coordinate;

determine a set position wireless network address of each unknown users having an unknown set position coordinate based on the position-setting classifier; and mark a relationship of at least two users based on a common relationship of the set position wireless network address.

Further, after acquiring a wireless network address and coordinate information of each user terminal, the method further comprises:

constructing a two-tuple dataset of <(x-coordinate, y-coordinate), wireless network address> for the each unknown user, and constructing a two-tuple dataset of <(x-coordinate, y-coordinate), wireless network address> within a set time period for the each known user;

clustering user positions, in the two-tuple dataset, of the unknown user according to a density-based clustering algorithm to form a first cluster, a second cluster, . . . , an $i^{th}$ cluster, . . . of the unknown user, wherein, the i is a positive integer; and clustering user positions, in the two-tuple dataset, of the known user according to the density-based clustering algorithm to form a set position cluster and a non-set position cluster of the known user.

Further, the training a position-setting classifier based on the wireless network address and the coordinate information of each known users having the known set position coordinate comprises:

training the position-setting classifier based on the set position cluster and the non-set position cluster of the each known user using a random forest algorithm or a gradient boost decision tree (GBDT) algorithm.

Further, the method further comprises: acquiring networking time information of each user terminal. Correspondingly, a training attribute of the position-setting classifier comprises at least one of:

a ratio of a number of days for occurrences of each wireless network address in the set position cluster of the known user to the set time period;

a ratio of a number of occurrences, at day, of each wireless network address in the set position cluster of the known user to a number of occurrences at night;

a ratio of a number of occurrences, in one time period, of each wireless network address in the set position cluster of the known user to a number of occurrences in another one of at least two time periods in a day; and a wireless network address entropy calculated based on a probability of occurrences of each wireless network address in the set position cluster of the known user.

Further, determining a set position wireless network address of each unknown users having an unknown set position coordinate based on the position-setting classifier comprises:

classifying, in the position-setting classifier sequentially, the two-tuples in each cluster of the unknown user to mark a set position cluster and a non-set position cluster of the unknown user; and searching the wireless network address most frequently occurring in the set position cluster of the unknown user and determining the same as the set position wireless network address of the unknown user.

Through the description of the foregoing implementations, a person skilled in the art may clearly know that the present disclosure may be implemented by means of software and necessary general hardware or of course by means of hardware, but in most cases the former is the better implementation manner. Based on such an understanding, the technical solutions of the present disclosure in essence or that part of contribution to the prior art may be embodied in the form of software products, which may be stored in computer-readable storage media, such as floppy disk, read-only memory (ROM), random access memory (RAM), flash, hard disk or optical disk of a computer, including some instructions so that a computer device (a personal computer, a server, or a network device, etc.) is caused to perform the methods as recited in each embodiment of the present disclosure.

It should be noted that in the foregoing embodiments of the apparatus for recognizing a user relationship, each included unit and module are divided only according to functional logic, but the present disclosure is not limited to the division, as long as corresponding functions can be implemented. In addition, specific names of functional units are merely provided for the purpose of distinguishing the units from one another, but are not intended to limit the protection scope of the present disclosure.

It is to be noted that the foregoing embodiments are merely preferred embodiments of the present disclosure and technical principles used thereby. Persons skilled in the art may understand that the present disclosure is not limited to the specific embodiments described herein, and persons skilled in the art may make various obvious changes, readjustments and substitutions without departing from the scope of protection of the present disclosure. Therefore, although reference is made to the present disclosure in more detail in the foregoing embodiments, the present disclosure is not merely limited to the foregoing embodiments, other more equivalent embodiments may be further included without departing from the conception of the present disclosure, and the scope of the present disclosure depends on the scope of the appended claims.

What is claimed is:

1. A method for recognizing a user relationship, comprising:
   acquiring a wireless network address and coordinate information of each of networked user terminals;
   acquiring the wireless network address and the coordinate information for each of known users having a coordinate of a known set position and each of unknown user having a coordinate of an unknown position based on the wireless network address and the coordinate information of the networked user terminals;
   constructing a two-tuple dataset of <(x-coordinate, y-coordinate), wireless network address> within a set time period for the each of known users;
   clustering user positions in the two-tuple dataset of the known users according to a density-based clustering algorithm to form a set position cluster and a non-set position cluster of the known users;
   training a position-setting classifier using a k-nearest neighbors algorithm (KNN) based on the wireless network address and the coordinate information of each of known users having the coordinate of the known set position, the training comprising using the set position cluster and the non-set position cluster of the known users as a dataset for a KNN classification of the position-setting classifier;
   determining a wireless network address of the set position for each of unknown users having the coordinate of the unknown position based on the position-setting classifier; and
   marking a relationship of at least two users among the known users and the unknown users based on a common relationship of the wireless network address of the set position.

2. The method according to claim 1, wherein the method further comprises:
   constructing a two-tuple dataset of <(x-coordinate, y-coordinate), wireless network address> for the each of unknown users; and
   clustering user positions in the two-tuple dataset of the unknown users according to a density-based clustering algorithm to form a first cluster, a second cluster, . . . , an ith cluster, . . . of the unknown users, wherein i is a positive integer.

3. The method according to claim 2, wherein the determining the set position wireless network address for each of unknown users having the coordinate of the unknown position based on the position-setting classifier comprises:
   classifying in the position-setting classifier sequentially the two-tuples in each cluster of the unknown users to mark the set position cluster and the non-set position cluster of the unknown users; and
   searching a wireless network address most frequently occurring in the set position cluster of the unknown users and determining the wireless network address as the wireless network address of the set position of the unknown user.

4. The method according to claim 1, further comprising: acquiring networking time information of the each of the networked user terminals; correspondingly, a training attribute of the position-setting classifier comprising at least one of:
   a ratio of a number of days for each wireless network address occurring in the set position cluster of the known users to the set time period;
   a ratio of a number of occurrences, at day, of each wireless network address in the set position cluster of the known users to a number of occurrences at night;
   a ratio of a number of occurrences, in one time period, of each wireless network address in the set position cluster of the known users to a number of occurrences in another one of at least two time periods in a day; and
   a wireless network address entropy calculated based on a probability of occurrences of each wireless network address in the set position cluster of the known users.

5. The method according to claim 1, wherein training the position-setting classifier using the k-nearest neighbors algorithm (KNN) based on the wireless network address and the coordinate information of each of known users having the coordinate of the known set position comprises:
   responsive to the known set position being associated with a family of a known user, training the position-setting classifier using at least one family cluster and at least one non-family cluster of the known user as the dataset for the KNN classification of the position-setting classifier; and
   responsive to the known set position being associated with a work site of the known user, training the position-setting classifier using at least one work site cluster and at least one non-work site cluster of the known user as the dataset for the KNN classification of the position-setting classifier.

6. An apparatus for recognizing a user relationship, comprising:
   at least one processor; and
   a memory storing instructions, wherein the instructions when executed by the at least one processor, cause the at least one processor to perform operations, the operations comprising:
   acquiring a wireless network address and coordinate information of each of networked user terminals;
   acquiring the wireless network address and the coordinate information for each of known users having a coordinate of a known set position and each of unknown user having a coordinate of an unknown position based on the wireless network address and the coordinate information of the networked user terminals;

constructing a two-tuple dataset of <(x-coordinate, y-coordinate), wireless network address> within a set time period for the each of known users;
clustering user positions in the two-tuple dataset of the known users according to a density-based clustering algorithm to form a set position cluster and a non-set position cluster of the known users;
training a position-setting classifier using a k-nearest neighbors algorithm (KNN) based on the wireless network address and the coordinate information of each of known users having the coordinate of the known set position, the training comprising using the set position cluster and the non-set position cluster of the known users as a dataset for a KNN classification of the position-setting classifier;
determining a wireless network address of the set position for each of unknown users having the coordinate of the unknown position based on the position-setting classifier; and
marking a relationship of at least two users among the known user and the unknown users based on a common relationship of the wireless network address of the set position.

7. The recognizing apparatus according to claim 6, wherein the operations further comprise:
constructing, after acquiring the wireless network address and the coordinate information of the each of networked user terminals, a two-tuple dataset of <(x-coordinate, y-coordinate), wireless network address> for the each of unknown users;
clustering user positions in the two-tuple dataset of the unknown users according to a density-based clustering algorithm to form a first cluster, a second cluster, ..., an ith cluster, ... of the unknown users, wherein i is a positive integer.

8. The recognizing apparatus according to claim 7, wherein the determining the set position wireless network address for each of unknown users having the coordinate of the unknown position based on the position-setting classifier comprises:
classifying in the position-setting classifier sequentially the two-tuples in each cluster of the unknown users to mark the set position cluster and the non-set position cluster of the unknown users; and
searching a wireless network address most frequently occurring in the set position cluster of the unknown users and determining the wireless network address as the wireless network address of the set position of the unknown user.

9. The recognizing apparatus according to claim 6, wherein the operations further comprise acquiring networking time information of the each of the networked user terminals; and correspondingly,
a training attribute of the position-setting classifier comprises at least one of:
a ratio of a number of days for each wireless network address occurring in the set position cluster of the known users to the set time period;
a ratio of a number of occurrences, at day, of each wireless network address in the set position cluster of the known users to a number of occurrences at night;
a ratio of a number of occurrences, in one time period, of each wireless network address in the set position cluster of the known users to a number of occurrences in another one of at least two time periods in a day; and
a wireless network address entropy calculated based on a probability of occurrences of each wireless network address in the set position cluster of the known users.

10. A non-transitory storage medium containing a computer-executable instruction, when being executed by a computer processor, the computer-executable instruction being configured to perform a method for recognizing a user relationship, wherein the method comprises:
acquiring a wireless network address and coordinate information of each of networked user terminals;
acquiring the wireless network address and the coordinate information for each of known users having a coordinate of a known set position and each of unknown user having a coordinate of an unknown position based on the wireless network address and the coordinate information of the networked user terminals;
constructing a two-tuple dataset of <(x-coordinate, y-coordinate), wireless network address> within a set time period for the each of known users;
clustering user positions in the two-tuple dataset of the known users according to a density-based clustering algorithm to form a set position cluster and a non-set position cluster of the known users;
training a position-setting classifier using a k-nearest neighbors algorithm (KNN) based on the wireless network address and the coordinate information of each of known users having the coordinate of the known set position, the training comprising using the set position cluster and the non-set position cluster of the known users as a dataset for a KNN classification of the position-setting classifier;
determining a wireless network address of the set position for each of unknown users having the coordinate of the unknown position based on the position-setting classifier; and
marking a relationship of at least two users among the known users and the unknown users based on a common relationship of the wireless network address of the set position.

* * * * *